United States Patent
Gao

(10) Patent No.: US 10,360,423 B2
(45) Date of Patent: Jul. 23, 2019

(54) IMAGE SENSOR WITH RANGE AND LIGHT-LEVEL DETECTION

(71) Applicant: Datalogic USA, Inc., Eugene, OR (US)

(72) Inventor: WenLiang Gao, Eugene, OR (US)

(73) Assignee: Datalogic USA, Inc., Eugene, OR (US)

(*) Notice: Subject to any disclaimer, the term of this patent is extended or adjusted under 35 U.S.C. 154(b) by 0 days.

(21) Appl. No.: 15/495,529

(22) Filed: Apr. 24, 2017

(65) Prior Publication Data

US 2018/0307880 A1    Oct. 25, 2018

(51) Int. Cl.
| | |
|---|---|
| *G06K 7/10* | (2006.01) |
| *G06K 7/14* | (2006.01) |
| *G06K 7/12* | (2006.01) |
| *H04N 1/00* | (2006.01) |

(52) U.S. Cl.
CPC ..... *G06K 7/10732* (2013.01); *G06K 7/10801* (2013.01); *G06K 7/10831* (2013.01); *G06K 7/12* (2013.01); *G06K 7/1439* (2013.01); *H04N 1/00334* (2013.01); *H04N 1/00769* (2013.01); *H04N 1/00835* (2013.01); *H04N 1/00702* (2013.01); *H04N 1/00734* (2013.01); *H04N 1/00997* (2013.01); *H04N 2201/0081* (2013.01)

(58) Field of Classification Search
CPC .......... G06K 7/10732; G06K 7/10801; G06K 7/10831; G06K 7/12; G06K 7/1439; H04N 1/00334; H04N 1/00769; H04N 1/00835
USPC ............................................. 235/455, 462.06
See application file for complete search history.

(56) References Cited

U.S. PATENT DOCUMENTS

| | | | |
|---|---|---|---|
| 7,360,706 B2 | 4/2008 | Zhu et al. | |
| 7,398,927 B2 | 7/2008 | Olmstead et al. | |
| 7,905,414 B2* | 3/2011 | Giebel | G02B 3/14 235/455 |
| 8,573,497 B2 | 11/2013 | Gao et al. | |
| 9,122,939 B2 | 9/2015 | Gao et al. | |
| 9,594,936 B1 | 3/2017 | Gao | |
| 9,704,007 B2 | 7/2017 | McQueen | |
| 9,710,686 B2 | 7/2017 | McQueen | |
| 2012/0181338 A1* | 7/2012 | Gao | G06K 7/12 235/455 |

* cited by examiner

*Primary Examiner* — Daniel A Hess
(74) *Attorney, Agent, or Firm* — Cozen O'Connor

(57) ABSTRACT

Systems and methods for selectively illuminating objects located within the field-of-view of an image sensor used to capture images in a machine-readable symbol reader. In an active illuminated reading mode, a light source illuminates objects as the image sensor captures images. In a self-illuminated object reading mode, used to capture images of smartphone, tablet, or other self-illuminating displays, the image sensor captures images without the light source illuminating the objects. The machine-readable symbol reader transitions between the two modes based upon distance and light-level measurements taken of the various objects that are within the field-of-view of the image sensor.

24 Claims, 7 Drawing Sheets

IMAGE SENSOR WITH RANGE AND LIGHT-LEVEL DETECTION

BACKGROUND

Technical Field

The present disclosure relates to a machine-readable symbol reader that includes object ranges and light-level detection capabilities.

Description of the Related Art

Machine-readable symbol readers, such as scanners and imager-based machine-readable readers, have become ubiquitous in today's environment. Such machine-readable symbol readers have been used to detect and capture one-dimensional machine-readable symbols (e.g., barcode symbols) and two-dimensional machine-readable symbols (e.g., Quick Response symbols) that have been attached to, inscribed or otherwise physically associated with various physical objects.

Machine-readable symbol readers typically include an active light source. For example, imager type machine-readable symbol readers may include one or more light emitting diodes (LEDs) that provide flood illumination in a field-of-view of the machine-readable symbol to allow an image of the machine-readable symbol to be captured. Also for example, scanner type machine-readable symbol readers typically include a laser that emits a laser beam and mirrors which move to scan the laser beam across the field-of-view of the machine-readable symbol to allow an electronic profile of the machine-readable symbol to be generated.

In some situations, machine-readable symbols may be printed on or inscribed in objects or materials, such as paper, books, or boxes, that are not self-illuminating. In some situations, machine-readable symbols may be presented on a self-illuminating screen, such as a display of a smartphone or tablet computer.

BRIEF SUMMARY

In the situation of a self-illuminating screen, the light from the active light source of an imager type machine-readable symbol reader may not be necessary to capture images of the machine-readable symbol as presented via the self-illuminated object. The additional light from the active light source may even saturate the image sensor pixels of the machine-readable symbol reader due to specular reflection, thereby resulting in an "over-exposed" image that may partially or completely obscure the image of the machine-readable symbol. In addition, in some situations, the displays of the self-illuminating objects may further include reflective material or coating similar to a mirror that reflect incident light such as ceiling light. In this situation, the reflective surface may reflect a large amount of light from the active light source of the machine-readable symbol reader back towards the image sensor of the machine-readable symbol reader, further hindering the image sensor to capture images of the machine-readable symbol.

A machine-readable symbol reader may need to capture images of machine-readable symbols displayed on both non-self-illuminating objects at one time and self-illuminated objects at another time. As such, the machine-readable symbol reader may transition between an active illuminated reading mode and a self-illuminated object reading mode. The ability to transition between modes may be performed automatically based on image characteristics, but such a method that is based on image characteristics may result in a large number of false positives and/or false negatives that would negatively impact the performance of the machine-readable symbol reader.

A method of operation in an apparatus to capture images of machine-readable symbols, the apparatus including an image sensor having a field-of-view, at least one active light source oriented and operable to selectively illuminate objects within the field-of-view of the image sensor, and at least a first transducer and a second transducer, may be summarized as including detecting a range to an object in the field-of-view of the image sensor via the first transducer; during an ambient light sample time period, while the at least one active light source does not illuminate the object in the field-of-view of the image sensor, detecting a level of ambient light in at least a portion of the field-of-view of the image sensor via the second transducer; and in response to a combination of both: i) the detected range to the object being within a threshold range and ii) the detected level of ambient light being above a threshold level, a) stopping the at least one active light source from illuminating the object in the field-of-view of the image sensor and b) capturing an image of the object in the field-of-view of the image sensor via the image sensor while the at least one active light source does not illuminate the object in the field-of-view of the image sensor.

The method may further include determining whether the captured image includes a machine-readable symbol within the captured image; and in response to determining that the captured image includes a machine-readable symbol within the captured image, entering a self-illuminated object reading mode. Entering a self-illuminated object reading mode may include exiting an active illuminated reading mode.

The method may further include during a second ambient light sample time period during the self-illuminated object reading mode, while the at least one active light source does not illuminate a second object in the field-of-view of the image sensor, detecting a level of ambient light in at least a portion of the field-of-view of the image sensor via the second transducer; and in response to the detected level of ambient light during the second ambient light sample time period being below a threshold level, a) activating the at least one active light source to illuminate the second object in the field-of-view of the image sensor and b) capturing an image of the second object in the field-of-view of the image sensor via the image sensor while the at least one active light source illuminates the second object in the field-of-view of the image sensor.

The method may further include entering an active illuminated reading mode.

The method may further include in the self-illuminated object reading mode, capturing additional images via the image sensor while the at least one active light source does not illuminate the object in the field-of-view of the image sensor.

The method may further include in the self-illuminated object reading mode, decoding each machine-readable symbol that appears in the images captured via the image sensor. Detecting the level of ambient light in at least a portion of the field-of-view of the image sensor during the ambient light sample time period may include detecting the level of light in an area that is smaller than an area encompassed by the field-of-view of the image sensor. The first transducer may include a time-of-flight transducer that detects range using a time-of-flight measurement. The second transducer may include a light intensity transducer that detects an intensity of light. The at least one transducer may be a single package that provides signals representative of the range to the object and the level of light detected in at least the portion of the field-of-view.

The apparatus may further include an emitter and a collector, wherein detecting the range to the object may further include transmitting an electromagnetic wave from the emitter, the electromagnetic wave being within a defined range of wavelengths, and receiving a reflected portion of the electromagnetic wave at the collector, the reflected portion of the electromagnetic wave being within the defined range of wavelengths and being reflected from the object.

An apparatus that captures images of objects within a field-of-view of the imager may be summarized as including an image sensor having a field-of-view; at least one active light source, operable to selectively illuminate the field-of-view of the imager; a range finder that detects a range to an object in the field-of-view of the image sensor; a light sensor that selectively detects a level of light in the field-of-view of the sensor; a processor communicatively coupled to receive signals representative of a range to an object and a level of light in the field-of-view of the image sensor; and a non-transitory processor-readable storage medium communicatively coupled to the processor, wherein the non-transitory processor-readable storage medium stores data or instructions that, when executed by the processor, cause the processor to: detect a range to an object in the field-of-view of the image sensor; during an ambient light sample time period, while the at least one active light source does not illuminate the object in the field-of-view of the image sensor, detect a level of light in at least a portion of the field-of-view of the image sensor; and in response to a combination of both: i) the detected range to the object being within a threshold range and ii) the detected level of light being above a threshold level, a) stop the at least one active light source from illuminating the object in the field-of-view of the image sensor and b) capture an image of the object in the field-of-view of the image sensor via the image sensor while the at least one active light source does not illuminate the object in the field-of-view of the image sensor.

The non-transitory storage media may further store instructions that when executed by the processor, may further cause the processor to: determine whether the captured image includes a machine-readable symbol within the captured image; and in response to the determination that the captured image includes a machine-readable symbol within the captured image, enter a self-illuminated object reading mode.

The non-transitory storage media may further store instructions that when executed by the processor, may further cause the processor to: exit an active illuminated reading mode.

The non-transitory storage media may further store instructions that when executed by the processor, may further cause the processor to: during a second ambient light sample time period during the self-illuminated object reading mode, while the at least one active light source does not illuminate a second object in the field-of-view of the image sensor, detect a level of light in at least a portion of the field-of-view of the image sensor via the at least one transducer; and in response to the detected level of light during the second ambient light sample time period being below a threshold level, a) activate the at least one active light source to illuminate the second object in the field-of-view of the image sensor and b) capture an image of the second object in the field-of-view of the image sensor via the image sensor while the at least one active light source illuminates the second object in the field-of-view of the image sensor.

The non-transitory storage media may further store instructions that when executed by the processor, may further cause the processor to: enter an active illuminated reading mode.

The non-transitory storage media may further store instructions that when executed by the processor, may further cause the processor to: in the self-illuminated object reading mode, capture additional images via the image sensor while the at least one active light source does not illuminate the object in the field-of-view of the image sensor.

The non-transitory storage media may further store instructions that when executed by the processor, may further cause the processor to: in the self-illuminated object reading mode, decode each machine-readable symbol that appears in the images captured via the image sensor. The light sensor may detect a level of light in an area that is smaller than an area encompassed by the field-of-view of the image sensor. The range finder may include a time-of-flight transducer that detects range using a time-of-flight measurement. The light sensor may include at least a light intensity transducer that detects an intensity of light. The time-of-flight transducer and the light intensity transducer may be included in a single package that provides signals representative of the range to the object and the level of light detected in at least the portion of the field-of-view of the image sensor.

The apparatus may further include an emitter that transmits electromagnetic waves within a defined range of wavelengths; and a collector that receives a reflected portion of the electromagnetic wave at the collector, the reflected portion of the electromagnetic wave within the defined range of wavelengths and being reflected from the object; wherein the non-transitory storage media further stores instructions that when executed by the processor, further cause the processor to: detect the range to the object based at least in part on the electromagnetic wave transmitted from the emitter and the reflected portion of the electromagnetic wave received by the collector.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with imagers and/or machine-readable symbol readers have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

Figure 1:
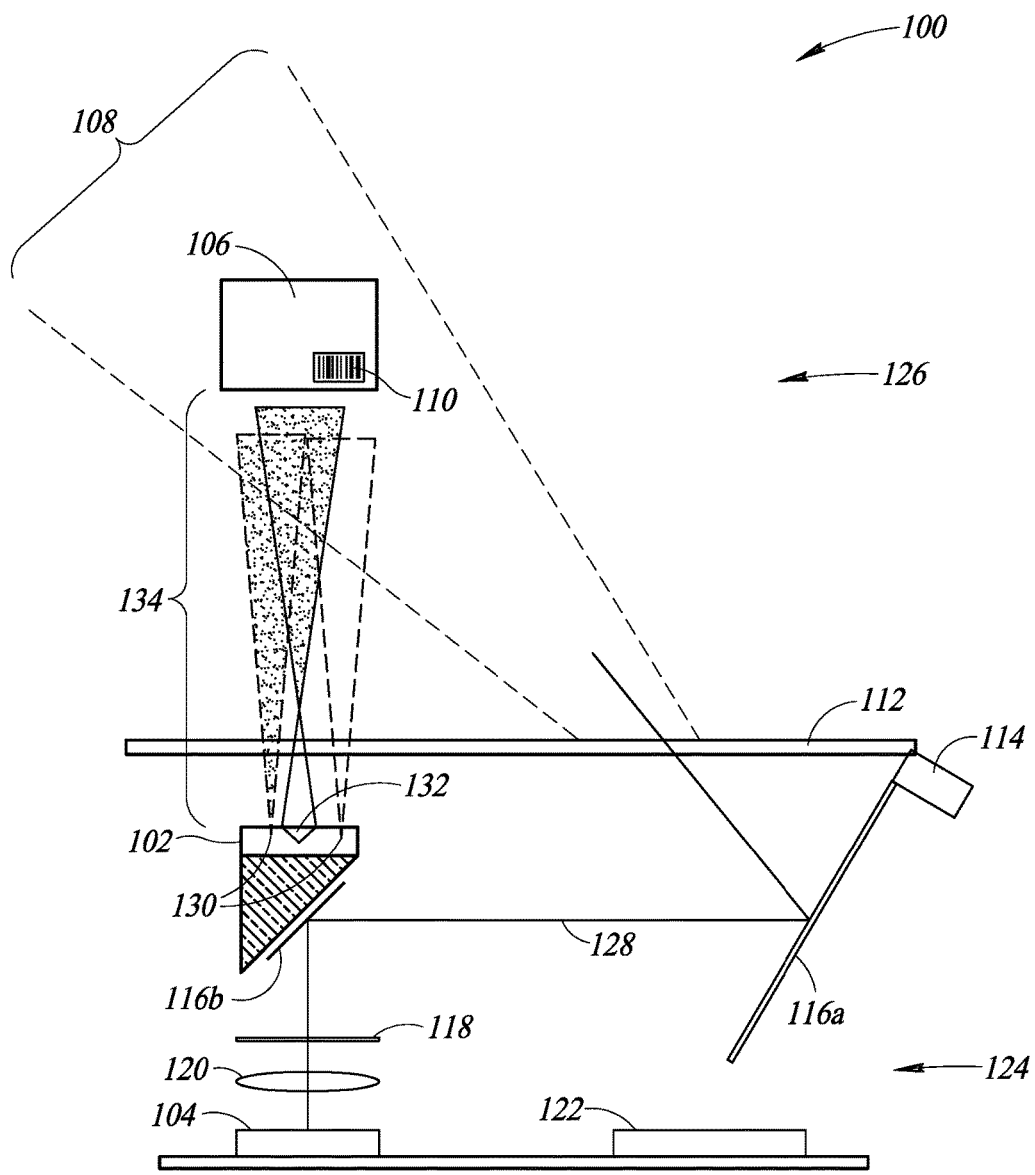
FIG. 1 is a schematic view of an object bearing a machine-readable symbol and a machine-readable symbol reader positioned to read the machine-readable symbol, the machine-readable symbol reader including a range and light-level detector and an image sensor, according to at least one illustrated implementation.

FIG. 1 shows a machine-readable symbol reader 100 that includes a range detector and a light-level detector (shown as a range and light-level detector 102) and an image sensor 104, according to at least one illustrated implementation. The range and light-level detector 102 may be used to detect the presence of an object 106 located within an image-sensor field-of-view 108 using a range detection capability. In addition, the range and light-level detector 102 may be used to detect an amount of light obtained from the object 106, and hence emitted by the object 106 (if any). In some implementations, the range and light-level detector 102 may be a single component that provides both range detection and light-level detection. For example, the VL6180 Time-of-Flight Sensor, Ambient Light Sensor and IR Emitter, sold by STMicroelectronics, may be a single component that provides rand detection and light-level detection. In some implementations, the range and light-level detector 102 may be comprised of a plurality of components, at least one of which provides range detection and another of which provides light-level detection. The image sensor 104 may be used to capture images of the object 106 located within the image-sensor field-of-view 108. The image sensor 104 may be used, for example, to capture images of machine-readable symbols 110 located on or attached to the object 106. The machine-readable symbols 110 may include, for example, barcode symbols, Quick Response symbols, other forms of two-dimensional machine-readable symbols, or any other similar visual representation of data that may be captured and decoded by a machine or processor. In some implementations, the image sensor 104 may be comprised of one or more transducers (e.g., array of charge coupled devices or CCD array) that convert the amount of received light to a voltage value.

The machine-readable symbol reader 100 may further include a window 112, an active light source 114, one or more mirrors (e.g., first mirror 116a and second mirror 116b, collectively, mirrors 116), a filter assembly 118, a lens assembly 120, and a control unit 122. The window 112 may separate an interior 124 of the machine-readable symbol reader 100 from an exterior 126. The window 112 may be comprised of one or more of glass, quartz, fluorite, acrylic plastics, or other materials that have desirable properties for passing through light to capture still or moving images.

The active light source 114 may be used to selectively illuminate objects 106 located within the image-sensor field-of-view 108. The active light source 114 may be comprised of one or more light emitting diodes (LEDs), which may take the form of standard LEDs or organic LEDs (OLEDs), and which can emit in a range of wavelengths (e.g., white-light, infrared, blue-light, etc.). The active light source 114 may be comprised of other suitable light emitting devices operable to provide a short duration, high-powered pulse of light that may be used to illuminate the image-sensor field-of-view 108 when the image sensor 104 is capturing an image.

The mirrors 116 may be used to form an optical path 128 from the image sensor 104 to the object 106 located within the image-sensor field-of-view 108 exterior 126 to the machine-readable symbol reader 100. The filter assembly 118 may include one or more optical filters that may be used to filter out certain wavelengths of electromagnetic radiation (e.g., visible light, ultraviolet light, radio waves, etc.) to facilitate the capture of the machine-readable symbol 110 by the image sensor 104. Such filters may include, for example, bandpass, notch, high-pass, and/or low pass filters. In some implementations, for example, the range and light-level detector 102 may use a certain wavelength of light (e.g., 850 nm) to detect the range of the object 106, using, for example, time-of-flight measurements. In such an implementation, the filter assembly 118 may include a notch filter centered on the wavelength of light used by the range and light-level detector 102 to perform a range-detection capability. The lens assembly 120 may be used to focus the incoming light traversing the optical path 128 onto the image sensor 104. The control unit 122 may be communicatively coupled to one or more of the range and light-level detector 102, the image sensor 104, and the active light source 114 and may transmit signals to such components to control the operation of the machine-readable symbol reader 100.

The machine-readable symbol reader 100 may have multiple modes of operation in which images of objects 106 located within the image-sensor field-of-view 108 are captured. In some implementations, one such mode may include an active illuminated reading mode in which the control unit 122 selectively activates the active light source 114 to momentarily illuminate the object 106 as the image sensor 104 captures an image of the object 106. In such an implementation, the range and light-level detector 102 may detect that the object 106 is within the image-sensor field-of-view 108. For example, the range and light-level detector 102 may detect the range 134 to the object 106 based upon time-of-flight measurements. In such an implementation, the range and light-level detector 102 may digitize the detected range 134 and generate a digitized representation of such range 134 using, for example, an 8 bit (256 values) or a 16 bit (65536 values) scale. In some implementations, the range and light-level detector 102 may detect proximity based upon the amount of light reflected back from the object 106. In such an implementation, the range and light-level detector 102 may generate one or more signals (e.g., voltage signals) indicative of the range 134 of the object 106 from the range and light-level detector 102. For example, the strength of a voltage signal may be directly proportional to the range 134 of the object 106 from the range and light-level detector 102.

The range and light-level detector 102 may transmit a signal indicating the level of light being emitted by or reflected from the object 106. In some implementations, the range and light-level detector 102 may digitize the detected light level and generate a digitized representation of the light level using, for example, an 8 bit (256 values) or a 16 bit (65536 values) scale. In some implementations, the range and light-level detector 102 may generate one or more signals (e.g., voltage signals) indicative of the light level. The range and light-level detector 102 may transmit the distance-related signal and/or the light-level signal to the control unit 122. The control unit 122 may compare the distance-related signals received from the range and light-level detector 102 to one or more stored thresholds (e.g., voltage thresholds) or ranges (e.g., voltage ranges) associated with distances from the range and light-level detector 102 that are within the image-sensor field-of-view 108. The control unit may compare the light-level signal to a threshold to determine if sufficient light is present to capture an image without using the active light source 114. When the control unit 122 detects that the distance-related signals received from the range and light-level detector 102 satisfies one of the thresholds and/or falls within one of the ranges such that the item is within the image-sensor field-of-view 108 but that the light-level signal received from the range and light-level detector 102 falls below the light-level threshold indicating the use of the active light source 114 to capture an image, the control unit 122 may transmit a first signal to keep the active light source 114 on thereby illuminating the image-sensor field-of-view 108 and a second signal to activate the image sensor 104 to capture an image of the object 106. The first signal and the second signal may be timed such that the active light source 114 illuminates the object 106 with a short, high-powered pulse of light over the same time period that the image sensor 104 captures the image of the object 106. The machine-readable symbol reader 100 may use the active illuminated reading mode to capture images of objects, such as papers, boxes, etc., that are visible by reflecting the existing light in an environment but are not self-illuminating.

In some implementations, the machine-readable symbol reader 100 may include a self-illuminated object reading mode. Such a mode may be used, for example, to capture images from objects, such as displays for smartphones, tablet computers, or other electronic devices, having a self-illuminating display that generates or emits light. In the self-illuminated object reading mode, the control unit 122 receives a signal from the range and light-level detector 102 indicating that an object 106 is within the image-sensor field-of-view 108, as noted before. Upon detecting that the object 106 is within the image-sensor field-of-view 108, the control unit 122 may transmit a signal to the image sensor 104 causing the image sensor 104 to capture an image of the object 106 without activing the active light source 114. The control unit 122 may continue to monitor the captured image and subsequent captured images to verify that the self-illuminating object, surface, or display is within the image-sensor field-of-view 108.

The machine-readable symbol reader 100 may transition from the active illuminated reading mode to the self-illuminated object reading mode based upon one or more signals generated by the range and light-level detector 102. In some implementations, for example, the range and light-level detector 102 may include a range finder 130 to detect the range 134 between the range and light-level detector 102 and an object 106. The range finder 130 may be positioned and oriented to detect the distances 134 to objects 106 located within the image-sensor field-of-view 108. In some implementations, the distance calculated by the range finder 130 may be a singular distance (e.g., 50 centimeters). In some implementations, the distance calculated by the range finder 130 may be a distance range (e.g., between 30 and 75 centimeters). In some implementations, the range finder 130 may generate and transmit a digitized representation of the detected distance. The distance-related signal may be transmitted to the control unit 122. Alternatively, or in addition, the range finder 130 may generate a signal that has a voltage value indicative of the range 134 between the range finder and the object 106. For example, in some implementations, a voltage of the signal generated by the range finder 130 may be directly proportional to the range 134 of the object 106 from the range finder 130.

The range finder 130 may be implemented by an emitter-collector pair that transmits a light, ultra-sonic, electromagnetic or other suitable signal towards the object using an emitter and detects the amount of time that lapses until at least a portion of the transmitted signal that has reflected or returned from the object 106 is received at a collector. The signal may have a temporal or frequency or wavelength pattern imposed thereon, for example to facilitate detection of the returned signal from ambient signals. In some implementations, a proximity sensor, such as a capacitive, photoelectric, inductive, or Hall Effect sensor, may be used to detect the distance or a distance range of an object to the range finder 130. In some implementations, for example, the range finder 130 may detect the distance to the object 106 based upon the amount of light that has been reflected from the object 106.

The range and light-level detector 102 may include a light sensor 132 that detects the amount of light present within an area. In some implementations, the ranger finder 130 may detect the distance to the object 106 and the light sensor 132 may detect the amount of light present during the same time period and/or during overlapping time periods. For example, the light sensor 132 may be positioned and oriented to detect the amount of light present within an area that includes the image-sensor field-of-view 108. The light sensor 132 may be used to capture the light level, e.g., measured in lux, of the amount of ambient light that is present when the active light source 114 is not activated or illuminated. In some implementations, the light sensor 132 may be comprised of a photo-sensor or photodetector or photo-diode that converts light into electrical current. The light sensor 132 may be exposed for a defined ambient light sample time period during which the light sensor 132 generates a signal indicative of the intensity or level of light that is detected. In such an implementation, the strength of the generated signal may be directly proportional to the level or intensity of the light. In some implementations, the light sensor 132 may output an analog signal indicative of the strength of the detected light. In some implementations, the light sensor 132 may generate digital data in which the level or intensity of light has been converted to a digital scale. For example, the light sensor 132 may generate and output an 8- or 16-bit count value indicative of the intensity of the detected light. The bit count value may be converted to a lux value, or any other appropriate lighting scale, using an appropriate conversion.

The control unit uses the distance-related signal received from the range finder 130 and the light-level related signal received from the light sensor 132 to transition between an active illuminated reading mode and a self-illuminated object reading mode. The control unit 122 may compare the voltage of the distance-related signal received from the ranger finder 130 to a threshold voltage or a voltage range. The threshold voltage or voltage range may be associated with the distance from the range finder 130 to the image-sensor field-of-view 108. In some implementations, for example, a threshold voltage may be set to indicate that the object 106 is within a certain distance (e.g., three inches) of the range finder 130 that corresponds to the image-sensor field-of-view 108. In some implementation, a voltage range may be set to indicate that the object 106 is within a certain range (e.g., one to three inches, or two to four inches) of distances from the range finder 130 that corresponds to the image-sensor field-of-view 108.

In addition, the control unit 122 may analyze the signal received from the light sensor 132 to detect if the object 106 generates sufficient light such that the active light source 114 need not be activated for the image sensor 104 to capture an image. In such a situation, the control unit 122 may compare the signal received from the light sensor 132 to a threshold value to determine if the signal meets or exceeds the threshold value. If the signal received from the range finder 130 is within the distance threshold or distance range value, and the signal received from the light sensor 132 meets or exceeds the light-level threshold value, then the control unit 122 may transmit a signal to activate the image sensor 104 to capture an image of the object 106 without activating the active light source 114. The control unit 122 may analyze the captured image to determine if it can detect a machine-readable symbol 110. If the control unit 122 detects a machine-readable symbol 110 within the captured image, then the control unit 122 may transition the machine-readable symbol reader 100 to a self-illuminated object reading mode in which the machine-readable symbol reader 100 captures images of objects 106 without using the active light source 114.

The control unit 122 may transition the machine-readable symbol reader 100 from a self-illuminated object reading mode to an active illuminated reading mode according to one of a number of conditions. For example, in some implementations, the control unit 122 may continue in the self-illuminated reading mode until it can no longer detect a machine-readable symbol 110 within the captured images. In such an implementation, the control unit 122 may activate the active light source 114 to illuminate the object 106 when the image sensor 104 captures the next image to determine if a machine-readable symbol 110 can be detected. If so, then the machine-readable symbol reader 100 may transition to the active illuminated reading mode. In some implementations, the control unit 122 may periodically activate the light sensor 132 when the range finder 130 detects that an object 106 is within the image-sensor field-of-view 108. If the signal from the light sensor 132 indicates that sufficient ambient light exists within the image-sensor field-of-view 108 (e.g., the signal meets or exceeds the threshold value for light intensity), then the control unit 122 may continue to operate the machine-readable symbol reader 100 in the self-illuminated object reading mode. If the signal from the light sensor 132 indicates that insufficient ambient light exists within the image-sensor field-of-view 108 (e.g., the signal fails to meet the threshold value for the light intensity), then the control unit 122 may transition to the active illuminated reading mode.

Figure 2:
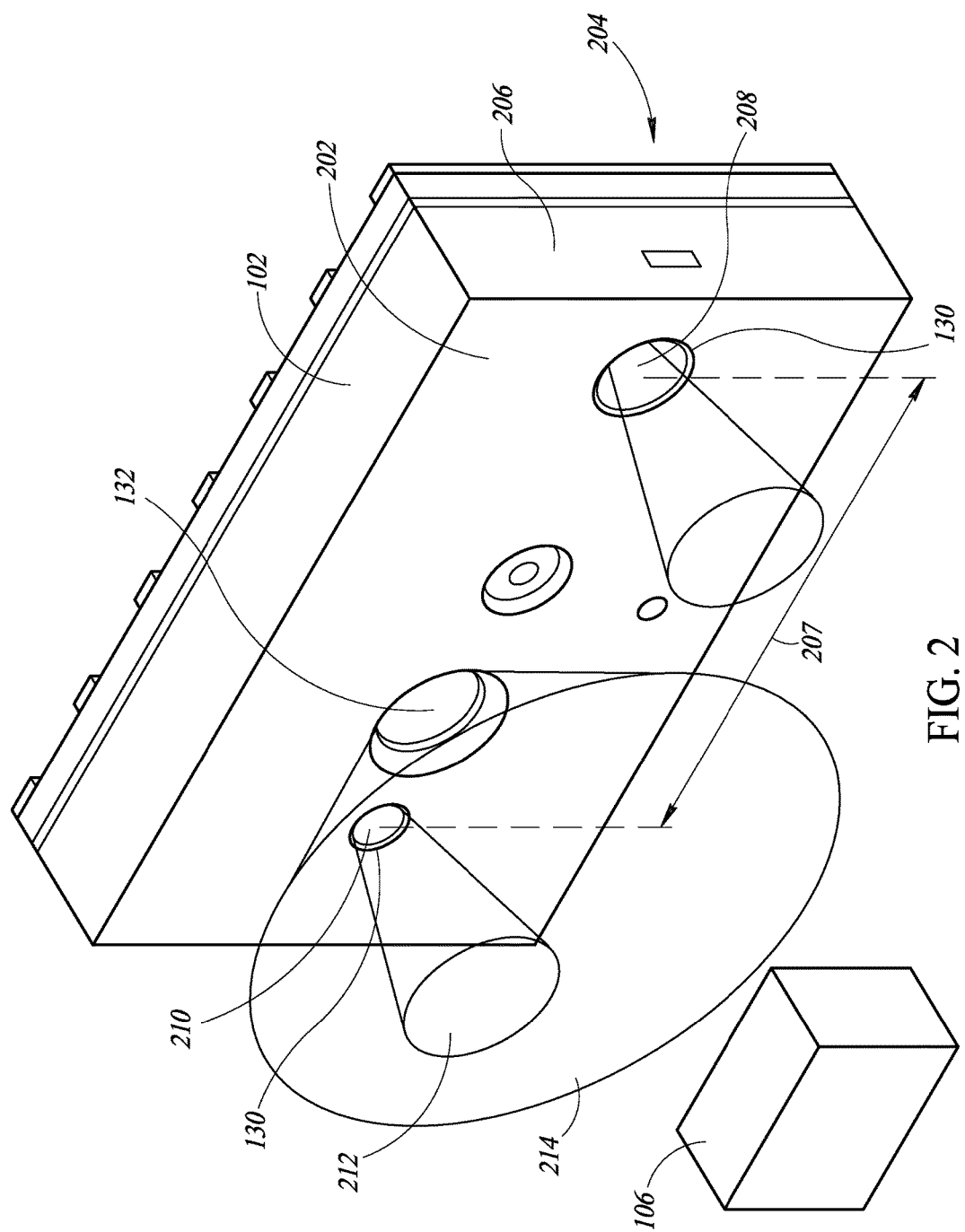
FIG. 2 is a front isometric view of a range and light-level detector that includes a range finder and a light sensor, according to at least one illustrated implementation.

FIG. 2 shows a range and light-level detector 102 that includes a range finder 130 and a light sensor 132, according to at least one illustrated implementation. The range and light-level detector 102 may have a front side 202, an opposing backside 204, and one or more side walls 206 located therebetween. The range finder 130 and the light sensor 132 may be located along the front side 202 and oriented to face outwards from the range and light-level detector 102. The range finder 130 may include an emitter 208 and a collector 210 that may be used to detect the range 134 between the range finder 130 and the object 106 located in front of the range and light-level detector 102. The emitter 208 and collector 210 may be separated by a distance 207 across the front side 202 of the range and light-level detector 102. In some implementations, the emitter 208 may transmit a signal (e.g., electromagnetic, ultrasonic, light) outwards from the front side 202 of the range and light-level detector 102. For example, the emitter 208 may transmit a light signal with a wavelength of 850 nm.

The collector 210 may include one or more transducers that detect signals at or around the same wavelength as the signals (e.g., waves) transmitted by the emitter 208. The collector 210 may have a collector field-of-view 212 extending outwards from the front side 202 of the range and light-level detector 102 and may detect such signals within the collector field-of-view 212 that are incident on the collector. In some implementations, the collector 210 may generate an electronic signal indicative of receiving or detecting such signals within the collector field-of-view 212. The collector field-of-view 212 may be directed towards and overlap, at least partially, with the image-sensor field-of-view 108.

In some implementations, the emitter 208 and the collector 210 may be used to provide a time-of-flight measurement to detect the range 134 between the range finder 130 and the object 106. In such an implementation, the emitter 208 may transmit a signal (e.g., electromagnetic, light, ultrasonic) outward towards the object 106. At least a part of the signals transmitted towards the object 106 may be incident on the object 106 and thereby reflected back towards the range and light-level detector 102. At least some of the reflected signals may be within the collector field-of-view 212 and may be incident on the collector 210. The difference in time between the transmission of the signals by the emitter 208 and receipt of the reflected signals by the collector 210 may be used to determine the range 134 between the range finder 130 and the object 106.

In some implementations, such a determination may be performed by the range finder 130, which may generate an output signal indicative of the range 134 between the range finder 130 and the object 106. In some implementations, for example, the strength of the signal generated by the range finder 130 may be directly or inversely proportional to the range 134 from the range finder 130. In some implementations, the collector may digitize the detected distance between the range finder 130 and the object 106, and output a digital representation of the detected distance. In some implementations, the distance determination may be performed at the control unit 122.

The range and light-level detector 102 may include a light sensor 132 that is oriented to face outwards from the front side 202 of the range and light-level detector 102. The light sensor 132 may have a light-sensor field-of-view 214 that extends outwards from the front side 202 of the range and light-level detector 102. The light-sensor field-of-view 214 may overlap, at least partially, with the image-sensor field-of-view 108. The light sensor 132 may include one or more transducers (e.g., photodiodes) that measure or detect the amount or level of light, measured in lux, within the light-sensor field-of-view 214. In some implementations, the light sensor 132 may digitize the measured light level and output a digital representation of the amount or level of light.

Figure 3:
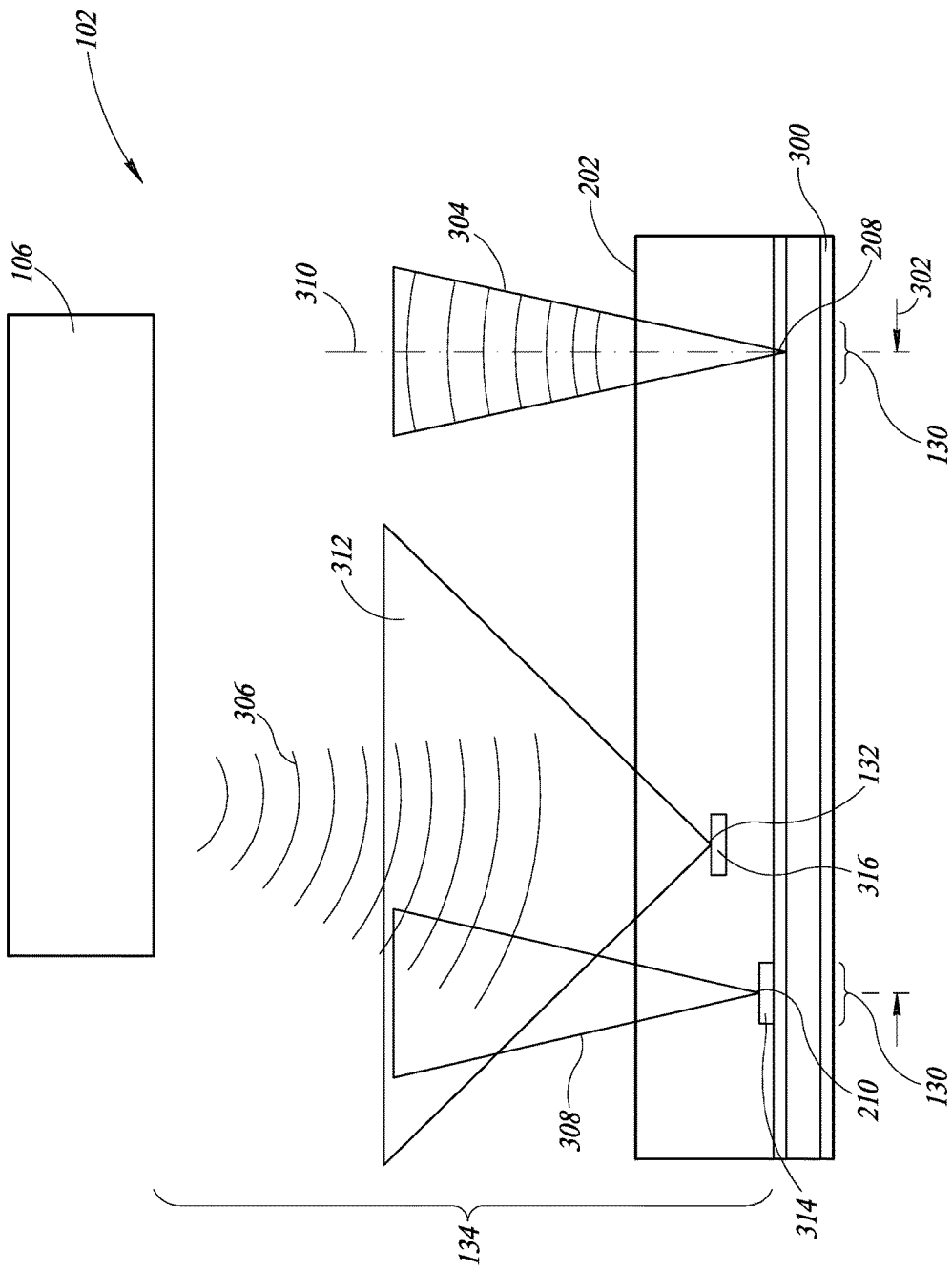
FIG. 3 is a top plan view of a range and light-level detector that includes an emitter and a collector, which together form a range finder, and a light sensor, according to at least one illustrated implementation.

FIG. 3 shows a range and light-level detector 102 that includes an emitter 208 and a collector 210, which together form a range finder 130, and a light sensor 132, according to at least one illustrated implementation. The emitter 208 and the collector 210 may be located on the same substrate 300 and separated by a distance 302. The emitter 208 may transmit an electromagnetic signal (e.g., wave) 304 outward from the front side 202 of the range and light-level detector 102 towards the object 106. The electromagnetic signal 304 may be of a certain wavelength or within a wavelength range. For example, in some implementations, the emitter 208 may transmit the electromagnetic signal 304 having an 850 nm wavelength. In some implementations, the emitter 208 may transmit the electromagnetic signal 304 along a central axis 310 that is perpendicular to a plane formed by the front side 202 of the range and light-level detector 102. In some implementations, the central axis 310 may intersect the plane formed by the front side 202 of the range and light-level detector 102 at a non-ninety degree angle. In some implementations, the emitter 208 may be positioned and oriented with respect to the collector 210 to optimize the amount of the electromagnetic signal 304 that will be reflected towards and received by the collector 210. As least some of the transmitted electromagnetic signal 304 may be incident on the object 106 and reflected back towards or otherwise returned to the collector 210 within the range and light-level detector 102 as a returned electromagnetic signal 306.

The collector 210 may be comprised of one or more transducers 314 that generate a voltage when electromagnetic signals are incident on the transducers. In some implementations, such the transducers 314 in the collector 210 may be reactive only to electromagnetic signal within a certain wavelength or wavelength range. For example, as implemented in the range and light-level detector 102, the collector 210 may have transducers 314 that are reactive to electromagnetic signals at or around the wavelength of the electromagnetic signal 304 transmitted by the emitter 208. Such transducers 314 may be a time-of-flight transducer that is used to provide a time-of-flight measurement. The collector 210 may have a field-of-view 308 that extends outward from the front side 202 of the range and light-level detector 102. The field-of-view 308 may represent a three-dimensional area in which the collector 210 may detect electromagnetic signals. The field-of-view 308 of the collector 210 may overlap, at least in part, with the image-sensor field-of-view 108 when the collector 210 is used in a range and light-level detector 102 that is included within a machine-readable symbol reader 100. At least some of the returned electromagnetic signal 306 may be within the field-of-view 308 of the collector 210, and may further be incident on the collector 210, causing the collector 210 to generate a resulting electronic signal. In such an implementation, the range 134 from the range and light-level detector 102 and the object 106 may be detected based upon the time difference between transmitting the electromagnetic signal 304 from the emitter 208 and receiving the reflected electromagnetic signal 306 at the collector 210.

The light sensor 132 may be positioned and oriented to face outwards of the front side 202 of the range and light-level detector 102. The light sensor 132 may be comprised of one or more transducers 316 that generate an electronic signal (e.g., a voltage or current) when light is incident on the transducers 316. Such a transducer 316 may include a light intensity transducer. As such, the light sensor 132 may generate an output signal indicative of the strength or level of light incident on the transducers in the light sensor 132. Such an output signal from the light sensor 132 may be an analog or a digital representation of the strength of the received and incident light. In some implementations, the light sensor 132 may provide the output electronic signal to the range and light-level detector 102. In such an implementation, the range and light-level detector 102 may further process the electronic signal received from the light sensor 132, such as, for example, by converting an analog signal received from the light sensor 132 to a digital representation, before providing an output indicative of the strength or level of light received by the light sensor 132.

The light sensor 132 may have a field-of-view 312 that is directed outwards from the front side 202 of the range and light-level detector 102. The field-of-view 312 of the light sensor 132 may represent a three-dimensional area in which the transducers 316 in the light sensor 132 may receive incident light. The field-of-view 312 of the light sensor 132 may overlap, at least in part, with the image-sensor field-of-view 108 when the light sensor 132 is used in a range and light-level detector 102 that is included within a machine-readable symbol reader 100. In some implementations, the area encompassed by the field-of-view 312 of the light sensor 132 may overlap, at least in part, but be smaller than the area encompassed by the image-sensor field of view 108. In such an implementation, the signal generated by the light sensor 132 may be used to determine if a self-illuminating object, such as a smartphone display, tablet computer display, or display from some other electronic device, is within the image-sensor field-of-view 108.

Figure 4A:
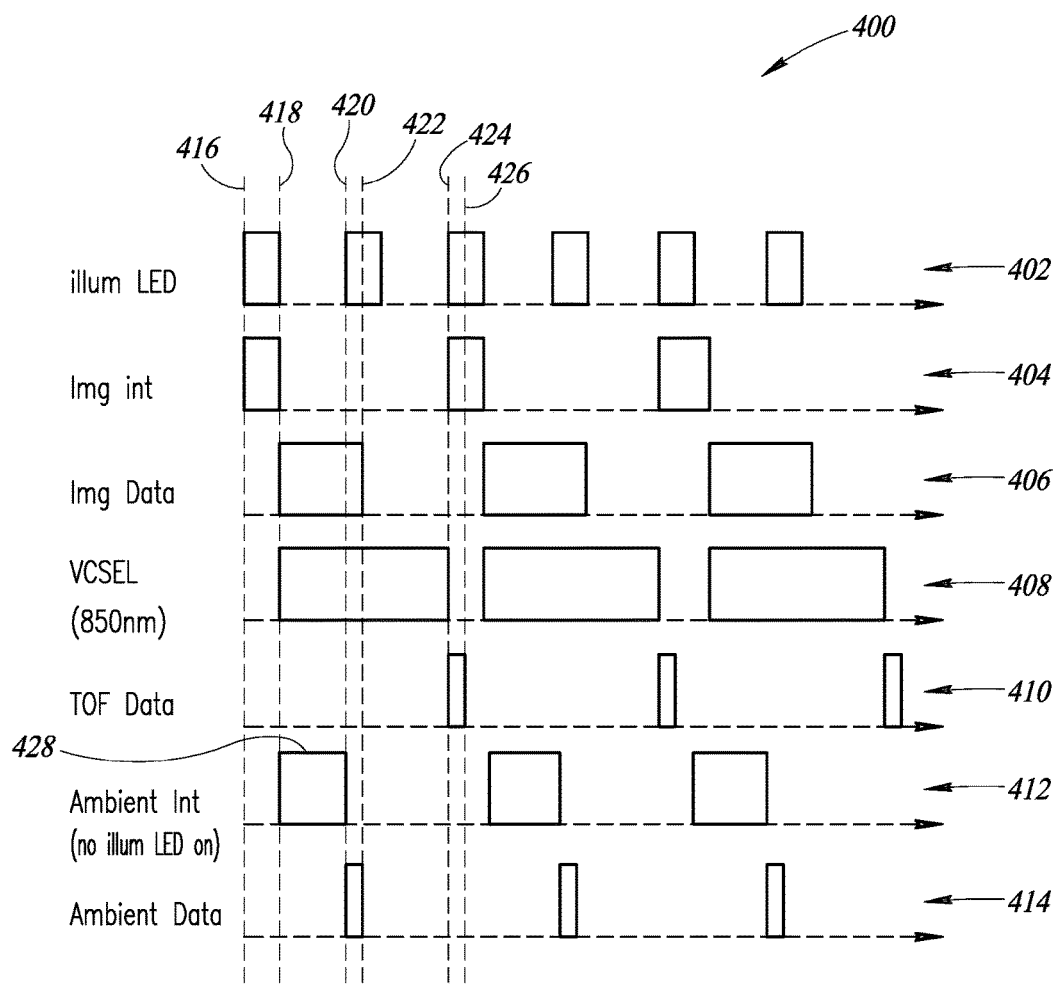
FIG. 4A is a timing diagram of signals that control the operation of an image sensor, a light source, a range detector, and a light-level detector when a machine-readable symbol reader is operating in an active illuminated reading mode, according to at least one illustrated implementation.

FIG. 4A is a timing diagram of a plurality of signals that control the operation of the image sensor 104, the active light source 114, the range finder 130, and the light sensor 132 when the machine-readable symbol reader 100 is operating in an active illuminated reading mode 400, according to at least one illustrated implementation. The timing diagram shows a light illumination signal 402 that controls the illumination of the active light source 114, an image capture signal 404 that controls the exposure of the image sensor 104 to the exterior 126 of the machine-readable symbol reader 100, an image data signal 406 that controls the display of image data captured from the image sensor 104, an emitter output signal 408 that controls the transmission of the electromagnetic wave 304 from the emitter 208, a collector control signal 410 that controls the collection of data from the collector 210, a light sensor control signal 412 that controls the exposure of the light sensor 132 to the exterior 126 of the machine-readable symbol reader 100 during an ambient light sample time period 428, and an ambient light signal 414 that controls the signal output by the range and light-level detector 102 related to the ambient light measurement. Each of the signals 402, 404, 408, 410, 412, and 414 may be generated and transmitted by the control unit 122.

In the active illuminated reading mode 400, the light illumination signal 402 transitions from low to high at a first time 416, causing the active light source 114 to turn on. Also at the first time 416, the image capture signal 404 transitions from low to high, causing the image sensor 104 to be exposed to the exterior 126 of the machine-readable symbol reader 100.

At a second time 418, the light illumination signal 402 transitions from high to low, causing the active light source 114 to turn off at a second time 418. The image capture signal 404 also transitions from high to low, causing the image sensor 104 to be deactivated and/or shielded from the exterior 126 of the machine-readable symbol reader 100 (e.g., by closing a camera door) at the second time 418. Further at the second time 418, the image data signal 406 transitions from low to high, causing the image data detected by the image sensor 104 to be transferred and stored within a memory component of the machine-readable symbol reader 100. Also at the second time 418, the emitter output signal 408 may transition from low to high, activating the emitter 208 and causing the emitter 208 to begin transmitting the electromagnetic signal (e.g., wave) 304. In addition at the second time 418, the ambient light signal 414 may transition from low to high, causing the light sensor 132 to activate and/or become exposed to the exterior 126 of the machine-readable symbol reader 100 to thereby being detecting the strength of the ambient light in the area within the field-of-view 312 of the light sensor 132. In some implementations, the light sensor 132 may be shielded from the exterior 126 of the machine-readable symbol reader 100, for example, by a selectively moveable cover (e.g., a camera door, mechanical aperture or electronic aperture) that moves to expose the light sensor 132 to the exterior 126 of the machine-readable symbol reader 100 when the ambient light signal 414 transitions from low to high. As depicted, the light sensor 132 may be exposed to the exterior 126 of the machine-readable symbol reader 100 only after the active light source 114 is turned off or deactivated. The light sensor 132 may generate an output signal indicative of the strength of the ambient light.

At the third time 420, the ambient light signal 414 may transition from high to low, thereby deactivating and/or shielding the light sensor 132 from the exterior 126 of the machine-readable symbol reader 100. The time period during which the light sensor 132 was exposed to the exterior 126 of the machine-readable symbol reader 100 may form an ambient light sample time period 428 over which the light sensor 132 makes an ambient light measurement. Also at the third time 420, the ambient light signal 414 may transition from low to high, thereby causing the signal generated by the light sensor 132 to be processed and/or output by the range and light-level detector 102. As such, the light sensor 132 may be used to detect and measure the amount of ambient light within the field-of-view 312 of the light sensor 132.

At the fourth time 422, the image data signal 406 transitions from high to low resulting in completing the transfer of the image data from the image sensor 104 to the memory component of the machine-readable symbol reader 100. Also at the fourth time 422, the ambient light signal 414 transitions from high to low. As a result, the ambient light measurement detected by the light sensor 132 may be stored and thereby provided as an output by the range and light-level detector 102.

At the fifth time 424, the light illumination signal 402 transitions from low to high, causing the active light source 114 to turn on, and the image capture signal 404 transitions from low to high, causing the image sensor 104 to be exposed to the exterior 126 of the machine-readable symbol reader 100, as previously described. Also at the fifth time 424, the emitter output signal 408 transitions from high to low, resulting in the emitter 208 being turned off. Further at the fifth time 424, the collector control signal 410 transitions from low to high, resulting in the collector 210 being activated or exposed to the exterior 126 of the machine-readable symbol reader 100.

At the sixth time 426, collector control signal 410 may transition from high to low, thereby deactivating and/or shielding the collector 210 from the exterior 126 of the machine-readable symbol reader 100. During the time period between the fifth time 424 and the sixth time 426, the collector 210 may capture returned electromagnetic signals (e.g., waves) 306 that have been reflected or otherwise returned from an object 106 located within the field-of-view 308 of the collector 210. The captured, reflected electromagnetic signals 306 may be used to detect a range 134 from the range and light-level detector 102 to the object 106. The signals 402, 404, 406, 408, 410, 412, and 414 may continue to repeat periodically.

Figure 4B:
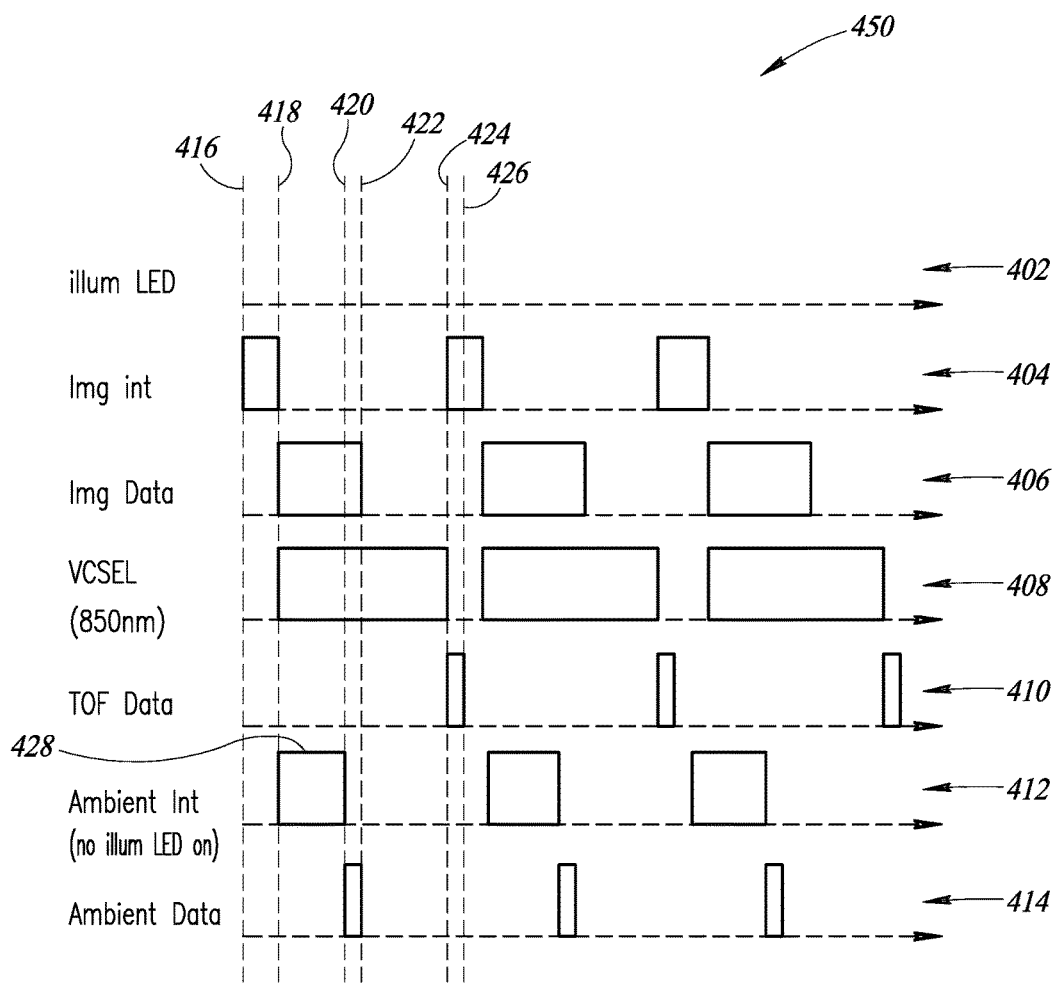
FIG. 4B is a timing diagram of signals that control the operation of an image sensor, a light source, a range detector, and a light-level detector when a machine-readable symbol reader is operating in self-illuminated object reading mode, according to at least one illustrated implementation.

FIG. 4B is a timing diagram of signals that control the operation of the image sensor 104, the active light source 114, the range finder 130, and the light sensor 132 when the machine-readable symbol reader 100 is operating in a self-illuminated object reading mode 450, according to at least one illustrated implementation. The timing diagram shows an image capture signal 404 that controls the exposure of the image sensor 104 to the exterior 126 of the machine-readable symbol reader 100, an image data signal 406 that controls the collection of data from the one or more transducers in the image sensor 104, an emitter output signal 408 that controls the transmission of the electromagnetic signal 304 from the emitter 208, a collector control signal 410 that controls the collection of data from the collector 210, a light sensor control signal 412 that controls the exposure of the light sensor 132 to the exterior 126 of the machine-readable symbol reader 100, and an ambient light signal 414 that controls the signal output by the range and light-level detector 102 related to the ambient light measurement. The timing for each of the signals 406, 408, 410, 412, and 414 may be the same in the self-illuminated object reading mode 450 shown in FIG. 4B as the active illuminated reading mode 400 shown in FIG. 4A. Unlike the active illuminated reading mode shown in FIG. 4A, however, the timing diagram in FIG. 4B shows that the light illumination signal 402, which controls activation of the active light source 114, never transitions to a high state. In such a situation, the active light source 114 may not be turned on during the self-illuminated object reading mode 450. In some implementations, the image capture signal 404 may last for a longer time period, thus increasing the exposure time of the image sensor 104 to the exterior 126 of the machine-readable symbol reader 100, in the self-illuminated object reading mode 450 as compared to the active illuminated reading mode 400.

Figure 5:
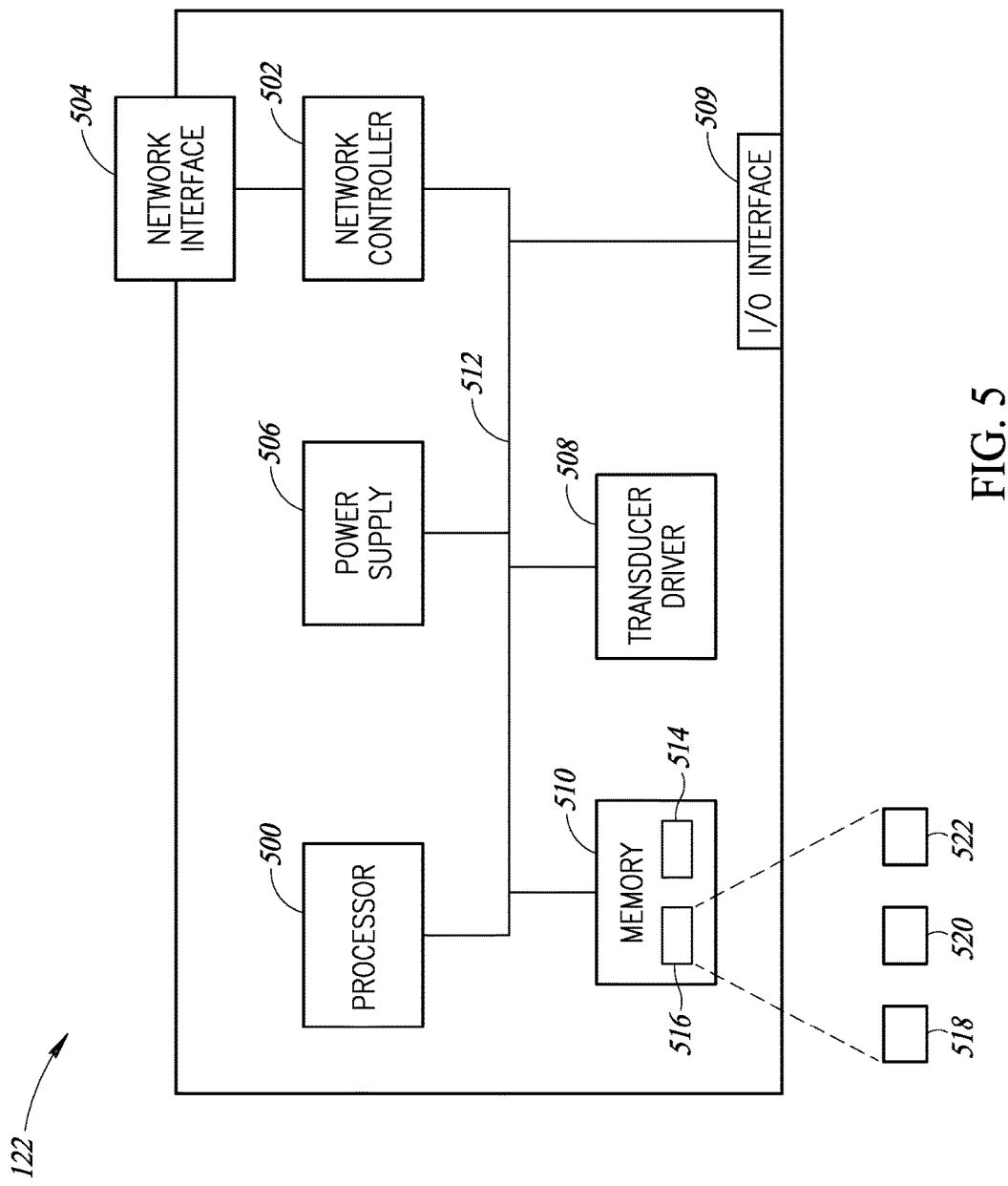
FIG. 5 is a block diagram of a control unit for the machine-readable symbol reader, according to at least one illustrated implementation.

FIG. 5 shows a control unit 122 used within a range and light-level detector 102, according to at least one illustrated implementation. The control unit 122 includes a processor 500, a network controller 502 and associated network interface 504, a power supply 506, a transducer driver 508, an input/output interface 509, and a system memory 510. Each of these components may be communicatively connected by bus(es) 512, which can provide bidirectional communication between the various components of the machine-readable symbol reader 100. Bus(es) 512 may take, for example, the form of a plurality of buses (e.g., data buses, instruction buses, power buses) included in at least one body.

The processor 500 for the control unit 122 may be any logic processing unit, such as one or more central processing units (CPUs), digital signal processors (DSPs), application-specific integrated circuits (ASICs), field programmable gate arrays (FPGAs), etc. The power supply 506 for the machine-readable symbol reader 100 may include one or more power supplies 506, which provide electrical power to the various components of the machine-readable symbol reader 100 via power connections. The power supply 506 may be an internal power supply, such as a battery, energy source, fuel cell, or the like.

The control unit 122 may include a network controller 502 and associated network interface 504 to enable the machine-readable symbol reader 100 to communicate with one or more communications or data networks. The network controller 502 may include one or more communications stacks to facilitate such network communication. Communications may be via the network interface 504 that includes a wired and/or a wireless network architecture to connect to, for instance, wired and wireless enterprise-wide computer networks, intranets, extranets, and/or the Internet. Other embodiments may include other types of communications networks including telecommunications networks, cellular networks, paging networks, and other mobile networks.

The control unit 122 may include one or more transducer drivers 508 that can be used to control the transducers in the image sensor 104 to capture images or other information from the environment exterior 126 to the machine-readable symbol reader 100 within the image-sensor field-of-view 108 of the image sensor 104. The control unit 122 may include one or more machine-readable symbol reader engines to optically read information from machine-readable symbols (e.g., one-dimensional or linear machine-readable symbols such as barcode symbols, two-dimensional machine-readable symbols, for instance Quick Response (QR) symbols, or the like).

The control unit 122 may include a system memory 510 that may comprise a hard disk drive (HDD) for reading from and writing to a hard disk, an optical disk drive for reading from and writing to removable optical disks, a magnetic disk drive for reading from and writing to magnetic disks, and/or a solid-state drive (SSD). The optical disk can be a CD-ROM, while the magnetic disk can be a magnetic floppy disk or diskette. The hard disk drive, optical disk drive, and magnetic disk drive may communicate with the processing unit 500 via the system bus 512. Those skilled in the relevant art will appreciate that other types of computer-readable media that can store data accessible by a computer may be employed, such as WORM drives, RAID drives, magnetic cassettes, flash memory cards, digital video disks ("DVD"), RAMs, ROMs, smart cards, etc.

System memory 510 can be used to store data 514 as well as one or more programs, applications, or routines 516. For example, the system memory 510 may store instructions for an active illuminated reading mode 518, instructions for a self-illuminated object mode 520, and one or more transition routines 522 to control transitions between the various modes.

The input/output interface 509 may provide an electrical and/or communicative coupling between the control unit 122 and one or more of the active light source 114 and the range and light-level detector 102. The input/output interface may transmit an output signal to control the active light source 114, the image sensor 104, and one or more components on the range and light-level detector 102. The input-output interface 509 may receive one or more signals transmitted from the range and light-level detector 102 and from the image sensor 104.

Figure 6:
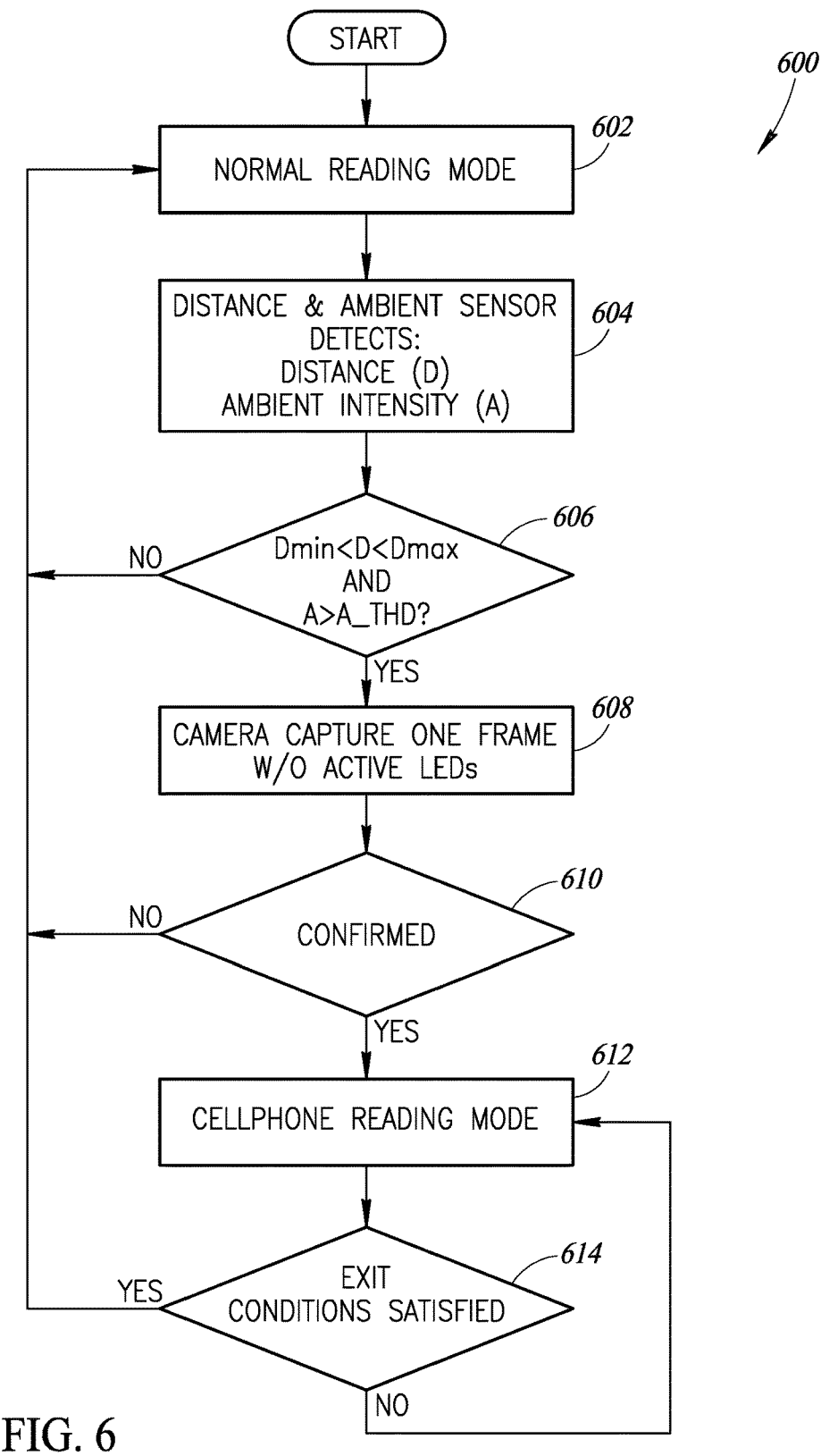
FIG. 6 is flow diagram of a method of operation of a machine-readable symbol reader to transition the machine-readable symbol reader between an active illuminated reading mode and a self-illuminated object mode, according to at least one illustrated implementation.

FIG. 6 shows a method 600 of operation of a machine-readable symbol reader, in which the machine-readable symbol reader transitions between an active illuminated reading mode 400 and a self-illuminated object mode 450, according to at least one illustrated implementation.

The method 600 begins, for example, at 602 with the machine-readable symbol reader 100 in an active illuminated reading mode 400, i.e., with the active light source(s) on for the majority of the time during the mode, emitting light into the image-sensor field-of-view 108. In some implementations, the active light source 114 may be flashed at a high rate at 602 to emit light into the image-sensor field-of-view 108. At 604, the range and light-level detector 102 detects the range of an object 106 that is within the image-sensor field-of-view 108. The range and light level detector 102 may further detect the light-level of the ambient light using the light sensor 132 for an area that is within the image-sensor field-of-view 108.

At 606, a comparison is made to determine: (i) if the detected range of the object 106 is within a threshold range 606a and (ii) if the detected ambient light level is above a specified ambient light threshold 606b. If the detected range for the object 106 is within the threshold range 606a and the detected ambient light level is above the specified ambient light threshold 606b, then the method 600 continues to 608. In some implementations, the threshold range 606a is between one and three inches, i.e., the object 106 is between one and three inches from the front side 202 of the range and light-level detector 102. In some implementations, the threshold range 606a is between zero and two inches. In some implementations, the threshold range 606a is between zero and three inches. In some implementations, the specified ambient light threshold 606b may be set to half of the full scale of the light sensor 132 (e.g., the equivalent of 5,000 lux, 10,000 lux, or some other similar value depending upon the sensor). In some implementations, the ambient light threshold 606b may be set based upon the expected intensity of the active-illumination source (e.g., a smartphone or tablet screen). If either of the conditions involving the threshold range 606a or the ambient light threshold 606b is not met, however, then the method 600 continues to 602 and proceeds in the active illuminated reading mode 400.

At 608, the image sensor 104 captures an image of the object 106 without the activation of the active light source 114.

At 610, the machine-readable symbol reader 100 determines if the captured image from 606 is a machine-readable symbol 110. If it is, then the method 600 continues to 612.

If the captured image does not show a machine-readable symbol 110, then the method 600 proceeds to 602 to continue in the active illuminated reading mode 400.

At 612, the machine-readable symbol reader 100 transitions to operate in a self-illuminated object reading mode 450, i.e., with the active light source(s) 114 off for the majority of the time during the mode, not emitting light into the field-of-view. In some implementations, the active light source(s) 114 may be off for the entire duration that the machine-readable symbol reader 100 operates in the self-illuminated object reading mode 450.

At 614, the machine-readable symbol reader 100 monitors the measurements detected from the range finder 130 and/or the light sensor 132 to determine if conditions to exit the self-illuminated object reading mode 450 are met. When such conditions are met, the method 600 goes to 602 to operate in the active illuminated reading mode 400. Such exit conditions may include, for example, a measurement by the range finder 130 that an object 106 is within the threshold range 606a but a measurement by the light sensor 132 that the ambient light level falls below the ambient light threshold 606b.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method of operation in an apparatus to capture images of machine-readable symbols, the apparatus including an image sensor having a field-of-view to sense an image-capture area, at least one active light source oriented and operable to selectively illuminate objects within the field-of-view of the image sensor, and at least a first transducer and a second transducer, the method comprising:
   detecting a range to an object in the field-of-view of the image sensor via the first transducer;
   during an ambient light sample time period, while the at least one active light source does not illuminate the object in the field-of-view of the image sensor, detecting a level of light in a light-sensing area at least partially overlapping with the image-capture area via the second transducer, wherein the light-sensing area is smaller than the image-capture area;
   determining whether the object is a self-illuminated object based on a combination of the range to the object and the detected level of light in the light-sensing area;
   in response to a determination of the object being a self-illuminated object, capturing an image of the object in the field-of-view of the image sensor via the image sensor while the at least one active light source does not illuminate the object in the field-of-view of the image sensor; and
   determining whether the captured image includes a machine-readable symbol within the captured image.

2. The method of claim 1 wherein the first transducer includes a time-of-flight transducer that detects range using a time-of-flight measurement.

3. The method of claim 2 wherein the second transducer includes a light intensity transducer that detects an intensity of light.

4. The method of claim 3 wherein the at least one transducer is a single package that provides signals representative of the range to the object and the level of light detected in at least the portion of the field-of-view.

5. The method of claim 1, wherein the apparatus further comprises an emitter and a collector, wherein detecting the range to the object further comprises:
   transmitting an electromagnetic wave from the emitter, the electromagnetic wave being within a defined range of wavelengths, and
   receiving a reflected portion of the electromagnetic wave at the collector, the reflected portion of the electromagnetic wave being within the defined range of wavelengths and being reflected from the object.

6. The method of claim 1, wherein determining whether the object is a self-illuminated object includes:
   determining whether the detected range to the object is within a defined threshold range for illumination measurement of a self-illuminated object; and
   determining whether the detected level of light in the light-sensing area is above a defined threshold level.

7. The method of claim 1, wherein the light-sensing area is within the image-capture area.

8. The method of claim 1, further comprising:
   in response to determining that the captured image includes a machine-readable symbol within the captured image, entering a self-illuminated object reading mode in which the image sensor captures an image of a second object while the at least one active light source does not illuminate the second object in the field-of-view of the image sensor.

9. The method of claim 8 wherein entering the self-illuminated object reading mode includes exiting an active illuminated reading mode.

10. The method of claim 9, further comprising:
during a second ambient light sample time period during the self-illuminated object reading mode, while the at least one active light source does not illuminate a second object in the field-of-view of the image sensor, detecting a level of ambient light in at least a portion of the field-of-view of the image sensor via the second transducer; and
in response to the detected level of ambient light during the second ambient light sample time period being below a threshold level, a) activating the at least one active light source to illuminate the second object in the field-of-view of the image sensor and b) capturing an image of the second object in the field-of-view of the image sensor via the image sensor while the at least one active light source illuminates the second object in the field-of-view of the image sensor.

11. The method of claim 10, further comprising:
entering an active illuminated reading mode.

12. The method of claim 11, further comprising:
in the self-illuminated object reading mode, capturing additional images via the image sensor while the at least one active light source does not illuminate the object in the field-of-view of the image sensor.

13. The method of claim 12, further comprising:
in the self-illuminated object reading mode, decoding each machine-readable symbol that appears in the images captured via the image sensor.

14. An apparatus that captures images of objects within a field-of-view of the imager, the apparatus comprising:
an image sensor having a field-of-view to sense an image-capture area;
at least one active light source, operable to selectively illuminate the field-of-view of the imager;
a range finder that detects a range to an object in the field-of-view of the image sensor;
a light sensor that selectively detects a level of light in a light-sensing area at least partially overlapping with the image-capture area, wherein the light-sensing area is smaller than the image-capture area;
a processor communicatively coupled to receive signals representative of a range to an object and a level of light in the field-of-view of the image sensor; and
a non-transitory processor-readable storage medium communicatively coupled to the processor, wherein the non-transitory processor-readable storage medium stores data or instructions that, when executed by the processor, cause the processor to:
detect a range to an object in the field-of-view of the image sensor;
during an ambient light sample time period, while the at least one active light source does not illuminate the object in the field-of-view of the image sensor, detect, using the light sensor a level of light in the light-sensing area;
determine whether the object is a self-illuminated object based on a combination of the range to the object and the detected level of light in the light-sensing area;
in response to a determination of the object being a self-illuminated object, capture an image of the object in the field-of-view of the image sensor via the image sensor while the at least one active light source does not illuminate the object in the field-of-view of the image sensor; and
determine whether the captured image includes a machine-readable symbol within the captured image.

15. The apparatus of claim 14, wherein the non-transitory storage media further stores instructions that when executed by the processor, further cause the processor to:
exit the active illuminated reading mode.

16. The apparatus of claim 15, wherein the non-transitory storage media further stores instructions that when executed by the processor, further cause the processor to:
during a second ambient light sample time period during the self-illuminated object reading mode, while the at least one active light source does not illuminate a second object in the field-of-view of the image sensor, detect a level of light in at least a portion of the field-of-view of the image sensor via the at least one transducer; and
in response to the detected level of light during the second ambient light sample time period being below a threshold level, a) activate the at least one active light source to illuminate the second object in the field-of-view of the image sensor and b) capture an image of the second object in the field-of-view of the image sensor via the image sensor while the at least one active light source illuminates the second object in the field-of-view of the image sensor.

17. The apparatus of claim 16, wherein the non-transitory storage media further stores instructions that when executed by the processor, further cause the processor to:
enter an active illuminated reading mode.

18. The apparatus of claim 17, wherein the non-transitory storage media further stores instructions that when executed by the processor, further cause the processor to:
in the self-illuminated object reading mode, capture additional images via the image sensor while the at least one active light source does not illuminate the object in the field-of-view of the image sensor.

19. The apparatus of claim 18, wherein the non-transitory storage media further stores instructions that when executed by the processor, further cause the processor to:
in the self-illuminated object reading mode, decode each machine-readable symbol that appears in the images captured via the image sensor.

20. The apparatus of claim 14 wherein the range finder includes a time-of-flight transducer that detects range using a time-of-flight measurement.

21. The apparatus of claim 20 wherein the light sensor includes at least a light intensity transducer that detects an intensity of light.

22. The apparatus of claim 21 wherein the time-of-flight transducer and the light intensity transducer are included in a single package that provides signals representative of the range to the object and the level of light detected in at least the portion of the field-of-view of the image sensor.

23. The apparatus of claim 14, further comprising:
an emitter that transmits electromagnetic waves within a defined range of wavelengths; and
a collector that receives a reflected portion of the electromagnetic wave at the collector, the reflected portion of the electromagnetic wave within the defined range of wavelengths and being reflected from the object;
wherein the non-transitory storage media further stores instructions that when executed by the processor, further cause the processor to:

detect the range to the object based at least in part on the electromagnetic wave transmitted from the emitter and the reflected portion of the electromagnetic wave received by the collector.

24. The apparatus of claim 14, wherein the non-transitory storage media further stores instructions that when executed by the processor, further cause the processor to:

in response to the determination of whether the captured image includes a machine-readable symbol within the captured image, enter a self-illuminated object reading mode in which the image sensor captures an image of a second object while the at least one active light source does not illuminate the second object in the field-of-view of the image sensor.

* * * * *